(12) United States Patent
Moniz et al.

(10) Patent No.: US 7,296,398 B2
(45) Date of Patent: Nov. 20, 2007

(54) COUNTER-ROTATING TURBINE ENGINE AND METHOD OF ASSEMBLING SAME

(75) Inventors: Thomas O. Moniz, Loveland, OH (US); Anant P. Singh, Cincinnati, OH (US); Daniel M. Allen, Blanchester, OH (US); Donald R. Bond, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 41 days.

(21) Appl. No.: 10/976,526

(22) Filed: Oct. 29, 2004

(65) Prior Publication Data

US 2006/0090450 A1    May 4, 2006

(51) Int. Cl.
  *F02C 7/06* (2006.01)
  *F02K 3/04* (2006.01)
(52) U.S. Cl. .................. 60/268; 60/39.08; 60/226.1
(58) Field of Classification Search ............. 60/39.08, 60/39.162, 226.1, 268, 772, 774
  See application file for complete search history.

(56) References Cited

U.S. PATENT DOCUMENTS

| | | | |
|---|---|---|---|
| 3,038,556 A | 6/1962 | Hamm et al. | |
| 3,528,241 A | 9/1970 | Venable et al. | |
| 3,703,081 A | 11/1972 | Krebs et al. | |
| 3,844,110 A | 10/1974 | Widlansky et al. | |
| 3,903,690 A | 9/1975 | Jones | |
| 5,307,622 A * | 5/1994 | Ciokajlo et al. | ......... 60/39.162 |
| 5,806,303 A | 9/1998 | Johnson | |
| 5,809,772 A | 9/1998 | Giffin, III et al. | |
| 5,813,214 A | 9/1998 | Moniz et al. | |
| 5,867,980 A | 2/1999 | Bartos | |
| 6,619,030 B1 | 9/2003 | Seda et al. | |
| 6,684,626 B1 | 2/2004 | Orlando et al. | |
| 6,711,887 B2 | 3/2004 | Orlando et al. | |
| 6,732,502 B2 | 5/2004 | Seda et al. | |
| 6,739,120 B2 | 5/2004 | Moniz et al. | |
| 6,763,652 B2 | 7/2004 | Baughman et al. | |
| 6,763,653 B2 | 7/2004 | Orlando et al. | |
| 6,763,654 B2 | 7/2004 | Orlando et al. | |

OTHER PUBLICATIONS

Great Britain Search Report; Ref. No. 13DV132284/11050; Application No. GB0521903.5; Mar. 21, 2006; 3 pgs.

* cited by examiner

*Primary Examiner*—L. J. Casaregola
(74) *Attorney, Agent, or Firm*—William Scott Andes; Armstrong Teasdale LLP

(57) ABSTRACT

A method for assembling a gas turbine engine that includes providing a first fan assembly configured to rotate in a first rotational direction, rotatably coupling a second fan assembly to the first fan assembly, wherein the second fan assembly is configured to rotate in a second rotational direction that is opposite the first rotational direction, coupling a first shaft to the first fan assembly and to a first turbine rotor that is configured to rotate in a first rotational direction, coupling a second shaft coupled to the second fan assembly and to a second turbine rotor that is configured to rotate in a second rotational direction that is opposite the first rotational direction, and coupling a lubrication system to the gas turbine engine such that a lubrication fluid is channeled through the first shaft to lubricate at least one of the first and second fan assemblies.

18 Claims, 6 Drawing Sheets

_US 7,296,398 B2_

COUNTER-ROTATING TURBINE ENGINE AND METHOD OF ASSEMBLING SAME

BACKGROUND OF THE INVENTION

This invention relates generally to aircraft gas turbine engines, and more specifically to counter-rotating gas turbine engines.

At least one known gas turbine engine includes, in serial flow arrangement, a forward fan assembly, an aft fan assembly, a high-pressure compressor for compressing air flowing through the engine, a combustor for mixing fuel with the compressed air such that the mixture may be ignited, and a high-pressure turbine. The high-pressure compressor, combustor and high-pressure turbine are sometimes collectively referred to as the core engine. In operation, the core engine generates combustion gases which are discharged downstream to a counter-rotating low-pressure turbine that extracts energy therefrom for powering the forward and aft fan assemblies. Within at least some known gas turbine engines, at least one turbine rotates in an opposite direction than the other rotating components within the engine At least one known counter-rotating low-pressure turbine has an inlet radius that is larger than a radius of the high-pressure turbine discharge. The increased size of the inlet radius enables the low-pressure turbine to accommodate additional stages. Specifically, at least one known counter-rotating low-pressure turbine includes an outer turbine having a first quantity of low-pressure stages that are rotatably coupled to the forward fan assembly, and an inner turbine having an equal number of stages that is rotatably coupled to the aft fan assembly.

During operation, lubrication is supplied to the forward and aft fan assemblies and to the low-pressure turbine utilizing a relatively complex lubrication system. Such lubrication systems are designed to supply lubricating fluid to a plurality of bearings supporting the forward and aft fan assemblies and the low-pressure turbine, for example. However, to lubricate the forward and aft fan assemblies and the low-pressure turbine, at least one known gas turbine engine is configured to channel the lubricating fluid around the plurality of rotating components that are rotating in opposite rotational directions. Accordingly, designing and implementing a lubrication system capable of lubricating the forward and aft fan assemblies and an low-pressure turbine within a counter-rotating gas turbine engine may result in increasing the overall weight of the gas turbine engine which may cause an associated increase in the costs of manufacturing and assembling the gas turbine engine.

BRIEF DESCRIPTION OF THE INVENTION

In one aspect, a method for assembling a gas turbine engine is provided. The method includes providing a first fan assembly configured to rotate in a first rotational direction, rotatably coupling a second fan assembly to the first fan assembly, wherein the second fan assembly is configured to rotate in a second rotational direction that is opposite the first rotational direction, coupling a first shaft to the first fan assembly and to a first turbine rotor that is configured to rotate in a first rotational direction, coupling a second shaft coupled to the second fan assembly and to a second turbine rotor that is configured to rotate in a second rotational direction that is opposite the first rotational direction, and coupling a lubrication system to the gas turbine engine such that a lubrication fluid is channeled through the first shaft to lubricate at least one of the first and second fan assemblies.

In another aspect, a gas turbine engine is provided. The gas turbine engine includes a first fan assembly configured to rotate in a first rotational direction, a second fan assembly rotatably coupled to the first fan assembly and configured to rotate in a second rotational direction that is opposite the first rotational direction, a first shaft coupled to the first fan assembly and to a first turbine rotor that is configured to rotate in a first rotational direction, a second shaft coupled to the second fan assembly and to a second turbine rotor that is configured to rotate in a second rotational direction that is opposite the first rotational direction, and a lubrication system coupled to the gas turbine engine such that a lubrication fluid is channeled through the first shaft to lubricate at least one of the first and second fan assemblies.

DETAILED DESCRIPTION OF THE INVENTION

Figure 1:
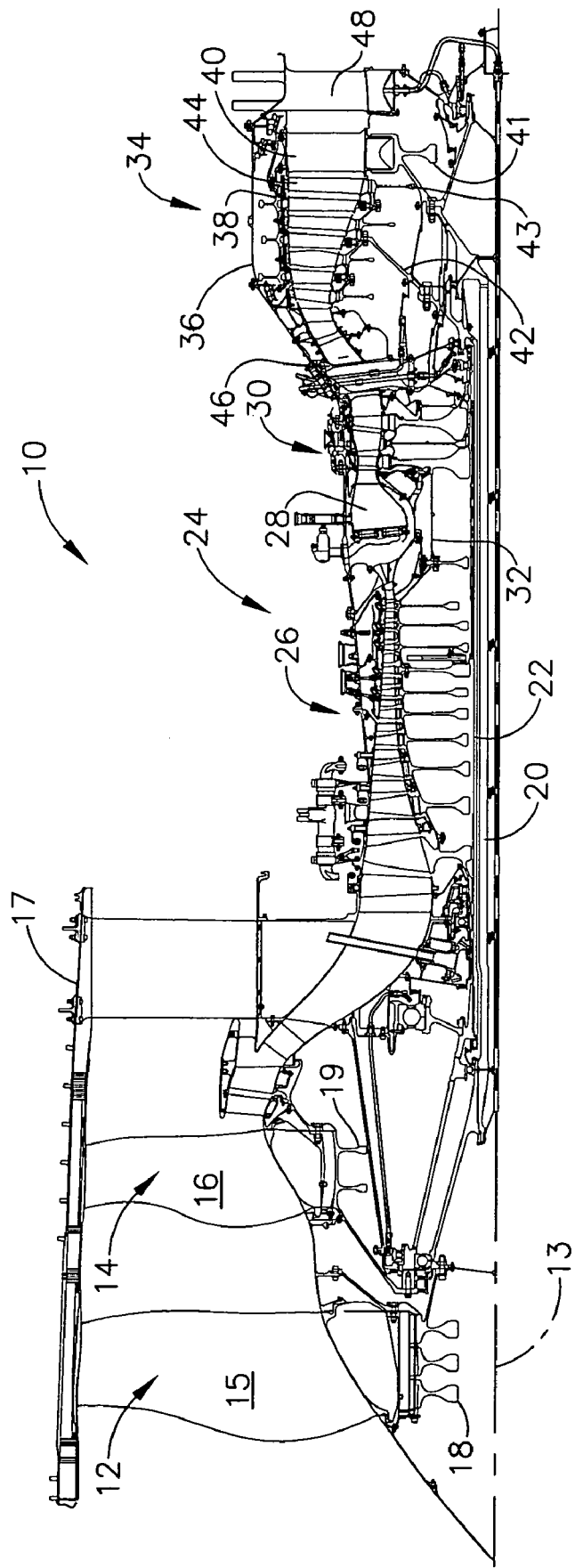
FIG. 1 is a cross-sectional view of a portion of an exemplary gas turbine engine.

FIG. 1 is a cross-sectional view of a portion of an exemplary gas turbine engine 10 that includes a forward fan assembly 12 and an aft fan assembly 14 disposed about a longitudinal centerline axis 13. The terms "forward fan" and "aft fan" are used herein to indicate that fan assembly 12 is coupled axially upstream from fan assembly 14. In one embodiment, fan assemblies 12 and 14 are positioned at a forward end of gas turbine engine 10 as illustrated. In an alternative embodiment, fan assemblies 12 and 14 are positioned at an aft end of gas turbine engine 10. Fan assemblies 12 and 14 each include a plurality of rows of fan blades 15 and 16, respectively, that are positioned within a nacelle 17. Blades 15 and 16 are coupled to respective rotor disks 18 and 19 that are rotatably coupled through a respective fan shaft 20 to forward fan assembly 12 and through a fan shaft 22 to aft fan assembly 14.

Gas turbine engine 10 also includes a core engine 24 that is downstream from fan assemblies 12 and 14. Core engine 24 includes a high-pressure compressor (HPC) 26, a combustor 28, and a high-pressure turbine (HPT) 30 that is coupled to HPC 26 via a core rotor or shaft 32. In operation, core engine 24 generates combustion gases that are channeled downstream to a counter-rotating low-pressure turbine 34 which extracts energy from the gases for powering fan assemblies 12 and 14 through their respective fan shafts 20 and 22.

Low-pressure turbine 34 includes a stationary outer casing 36 that is coupled to core engine 24 downstream from high-pressure turbine 30. Low-pressure turbine 34 includes a radially outer rotor 38 that is positioned radially inwardly of outer casing 36. Outer rotor 38 has a generally frusto-conical shape and includes a plurality of circumferentially-spaced rotor blades 40 that extend radially inwardly. Blades 40 are arranged in axially-spaced blade rows or stages 41. Although, the exemplary embodiment only illustrates four stages 41, it should be realized that outer rotor 38 may have any quantity of stages 41 without affecting the scope of the method and apparatus described herein.

Low-pressure turbine 34 also includes a radially inner rotor 42 that is aligned substantially coaxially with respect to, and radially inward of, outer rotor 38. Inner rotor 42 includes a plurality of circumferentially-spaced rotor blades 43 that extend radially outwardly and are arranged in axially-spaced rows 44. Although, the exemplary embodiment only illustrates four stages, it should be realized that inner rotor 42 may have any quantity of rows 44 of blades 43 without affecting the scope of the method and apparatus described herein. In the exemplary embodiment, inner rotor 42 is rotatably coupled to a turbine mid-frame 46, and outer rotor 38 is rotatably coupled to a turbine rear-frame 48.

In the exemplary embodiment, inner rotor blades 43 extending from stages 44 are axially-interdigitated with outer rotor blades 40 extending from stages 41 such that inner rotor stages 44 extend between respective outer rotor stages 41. The blades 40 and 43 are therefore configured for counter-rotation of the rotors 38 and 42.

Figure 2:
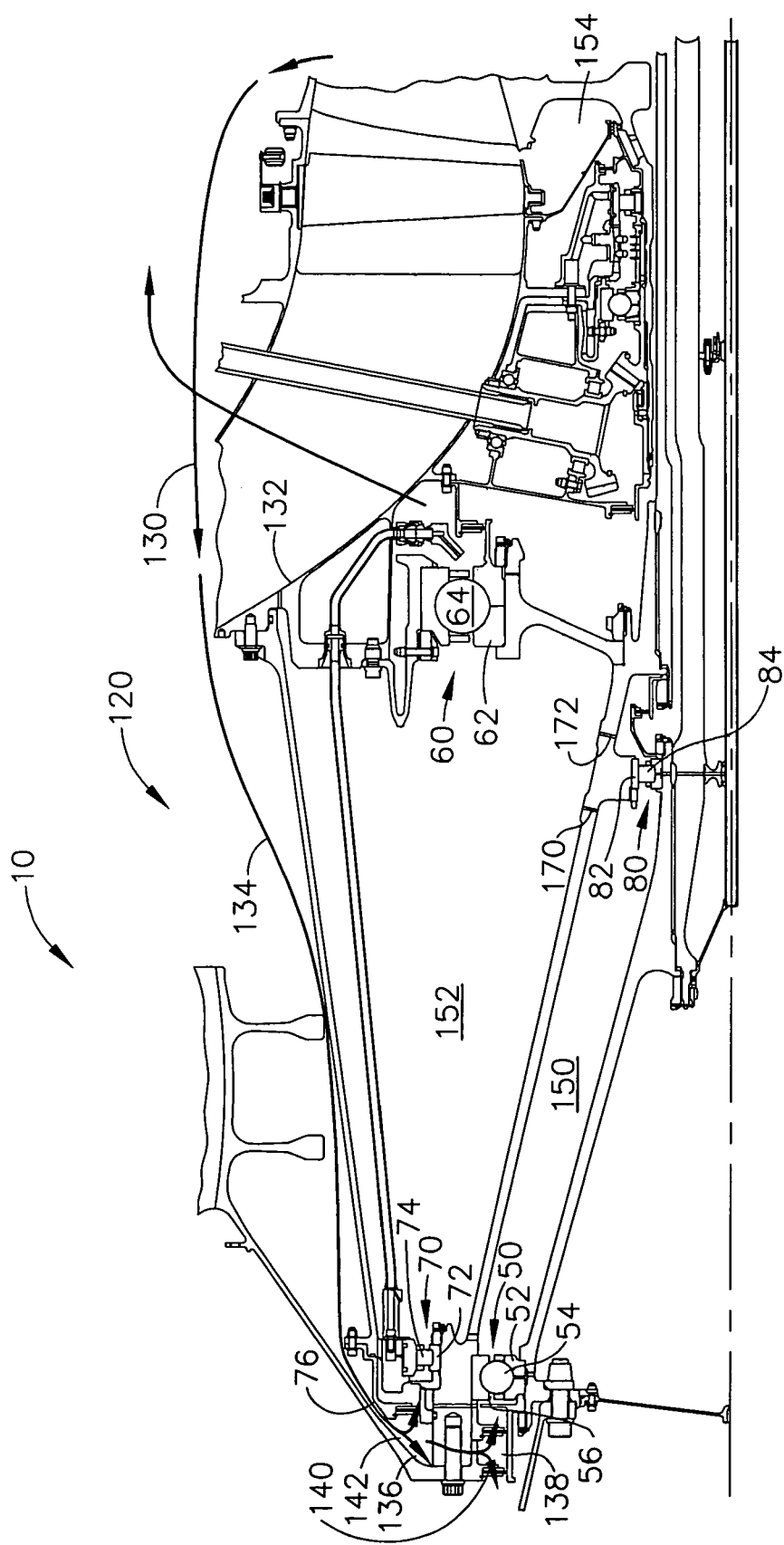
FIG. 2 is a cross-sectional view of a forward sump pressurization system that can be used with the gas turbine engine shown in FIG. 1.
Figure 3:
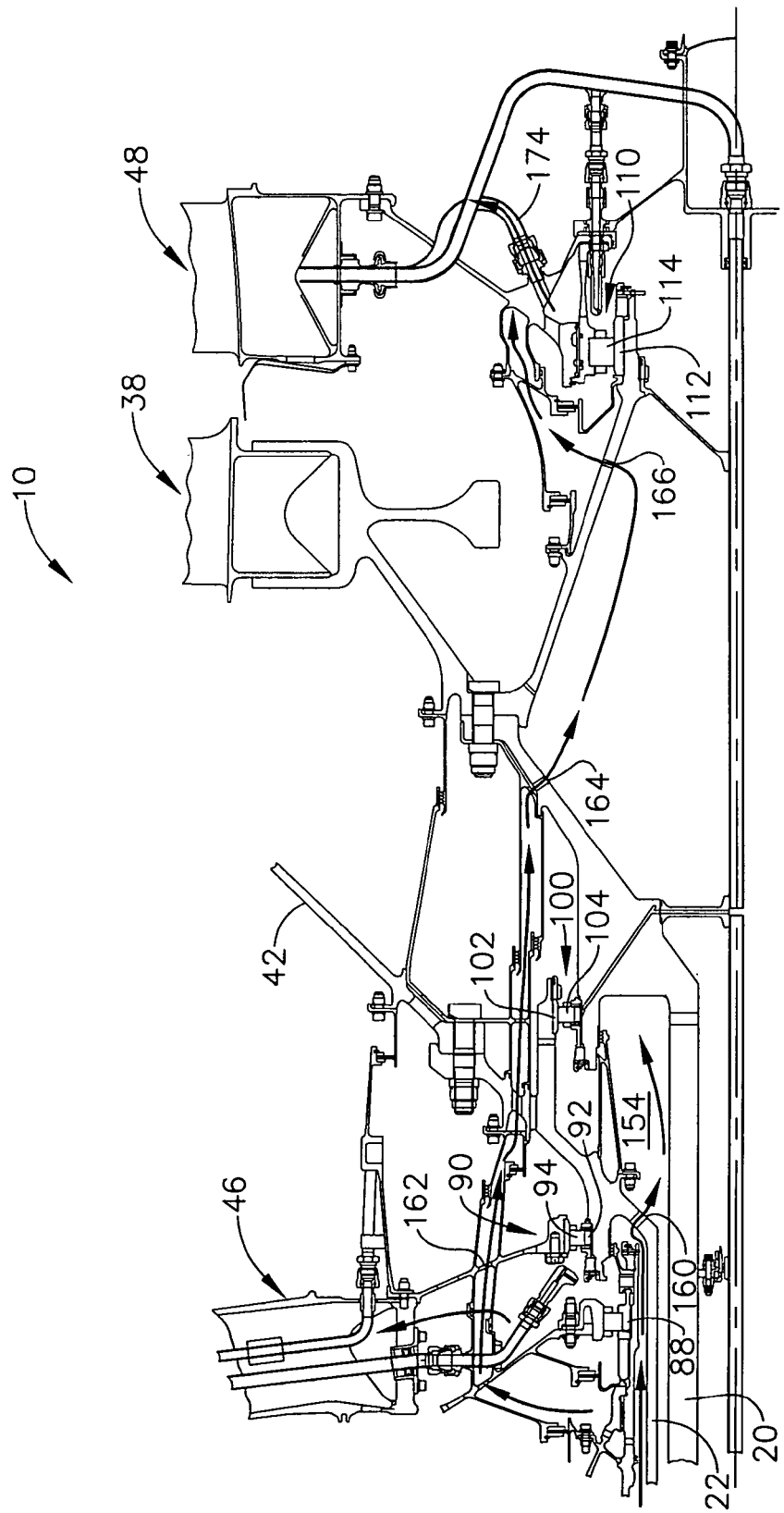
FIG. 3 is a cross-sectional view of an aft sump pressurization system that can be used with the gas turbine engine shown in FIG. 1.

FIG. 2 is a cross-sectional view of a forward portion of gas turbine engine 10. FIG. 3 is a cross-sectional view of an aft portion of gas turbine engine 10. In the exemplary embodiment, gas turbine engine 10 also includes a first fan bearing assembly 50, a second fan bearing assembly 60, a third fan bearing assembly 70, a fourth fan bearing assembly 80, a first low-pressure turbine bearing assembly 90, a second low-pressure turbine bearing assembly 100, and a third low-pressure turbine bearing assembly 110. First fan bearing assembly 50 includes a bearing race 52 and a rolling element 54 coupled to bearing race 52. Second fan bearing assembly 60 includes a bearing race 62 and a rolling element 64 coupled to bearing race 62. In the exemplary embodiment, fan bearing assemblies 50 and 60 are thrust bearings that are configured to maintain forward fan assembly 12 and aft fan assembly 14, respectively, in a relatively fixed axial position. Third fan bearing assembly 70 includes a bearing race 72 and a rolling element 74 that is coupled to bearing race 72. Fourth fan bearing assembly 80 includes a bearing race 82 and a rolling element 84 that is coupled to bearing race 82. In the exemplary embodiment, fan bearing assemblies 70 and 80 are roller bearings that are configured to maintain forward and aft fan assemblies 12 and 14, respectively, in a relatively fixed radial position.

First low-pressure turbine bearing assembly 90 includes a bearing race 92 and a rolling element 94 that is coupled to bearing race 92. In the exemplary embodiment, bearing assembly 90 is coupled between shaft 22 and turbine mid-frame 46 such that inner rotor 42 is rotatably coupled to turbine mid-frame 46. Second low-pressure turbine bearing assembly 100 includes a bearing race 102 and a rolling element 104 that is coupled to bearing race 102. In the exemplary embodiment, bearing assembly 100 is coupled between shaft 22 and shaft 20 such that outer rotor 38 is rotatably coupled to inner rotor 42 and thus to turbine mid-frame 46. Third low-pressure turbine bearing assembly 110 includes a bearing race 112 and a rolling element 114 that is coupled to bearing race 112. In the exemplary embodiment, bearing assembly 110 is coupled between shaft 22 and turbine rear-frame 48 such that outer rotor 38 is rotatably coupled to turbine rear-frame 48.

Gas turbine engine 10 also includes an engine sump pressurization system 120. Sump pressurization system 120 includes a first manifold 130 that extends between compressor 26 and a fan frame strut support 132, and a second manifold 134 that extends between fan frame strut support 132 and an aft fan assembly rotor/stator interface 136 to facilitate pressurizing a counter-rotating seal 138 and a rotor/stator interface seal 140 that are each coupled axially forward of bearing assembly 50. More specifically, manifold 130 is coupled to compressor 26 and fan frame strut support 132 such that compressed air discharged from compressor 26 is channeled through fan frame strut support 132 and into manifold 134.

During operation, the compressed air is then channeled through second manifold 134 and into a cavity 142 that is defined between bearing races 52 and 72, respectively, and rotor/stator interface 136. The compressed air is then channeled through an opening 56 formed through bearing race 52 and an opening 76 formed through bearing race 72 to facilitate pressurizing bearing assemblies 50 and 70, respectively.

In the exemplary embodiment, sump pressurization system 120 includes a first cavity 150 that is defined between shafts 20 and 22, and a second cavity 152 that is defined radially outward from shaft 22. More specifically, compressed air that is vented from each respective bearing assembly 50 and 70 is channeled into a respective cavity 150 and 152, respectively. Additional sump pressurization air is channeled through a cavity 154 that is defined between shafts 32 and 22 axially aft and returns axially forward between shafts 20 and 22. Pressurization air channeled axially aft facilitates pressurizing bearing assemblies 88, 90, 100, and 110 respectively. More specifically, a first portion of the compressed air within cavity 154 is channeled through an opening 160 that is defined through shaft 22 to facilitate pressurizing bearing assembly 100. A second portion of the air is channeled through an opening 162 that is defined through turbine mid-frame 46, through a second opening 164 and a third opening 166 that are both defined through second shaft 22 to facilitate pressurizing bearings 100 and 110 respectively.

During operation, air vented from each respective bearing assembly 50 and 70 is channeled into cavities 150 and 152, respectively. The discharged air is then channeled from cavities 150 and 152 to bearing assemblies 60 and 80 respectively. The spent air from bearing assembly 80 is then channeled through at least one opening 170 and/or 172 defined within shaft 22 and into cavity 152 to bearing assembly 60. The spent air from bearing assemblies 60 and 80 is then discharged through fan frame strut support 132. Additionally, the air vented from each respective bearing assembly 90, 100, and 100 is discharged through turbine mid-frame 46 and/or turbine rear-frame 48 via a turbine sump vent manifold 174.

Figure 4:
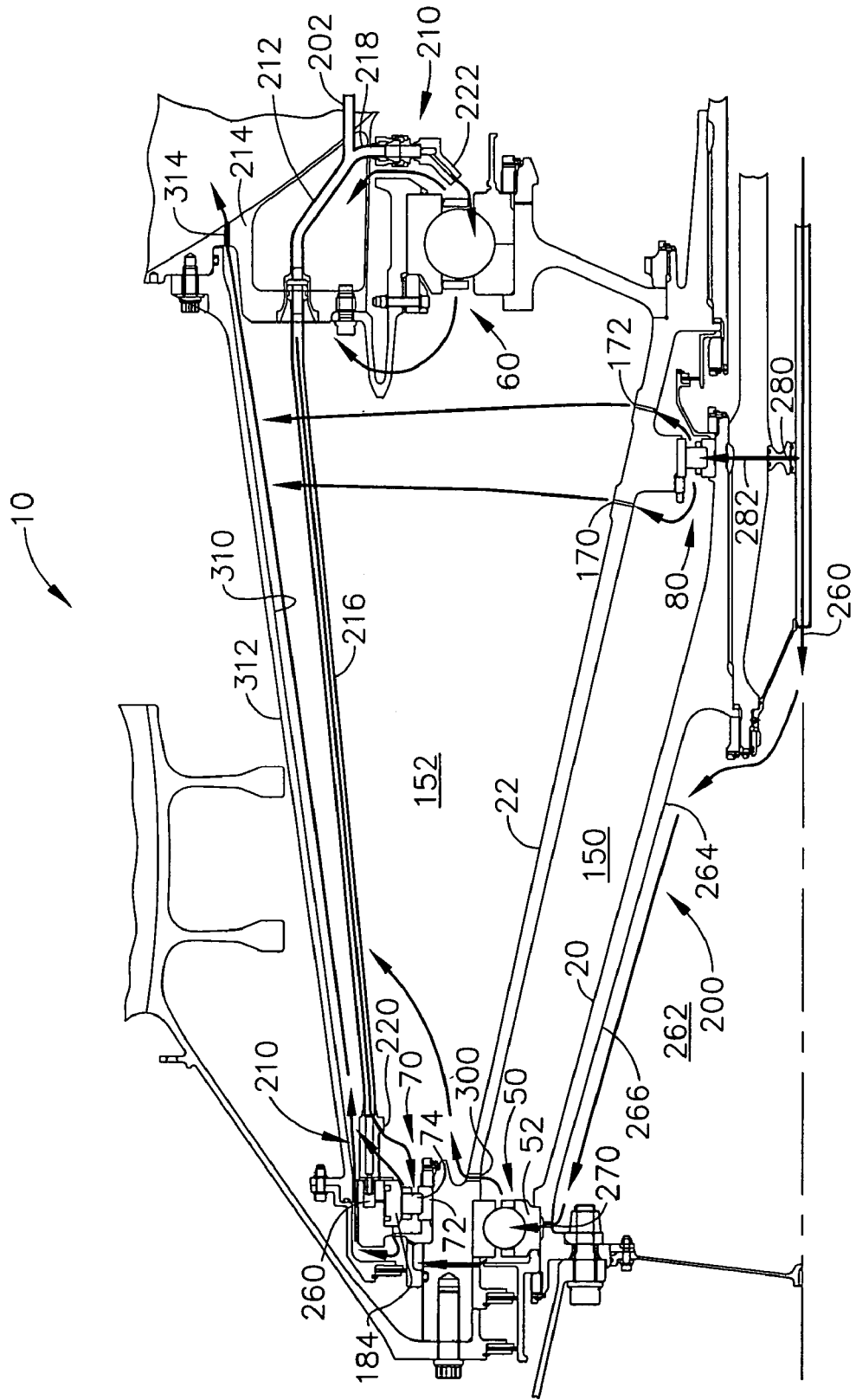
FIG. 4 is a cross-sectional view of a forward portion of gas the turbine engine shown in FIG. 1 that includes an engine lubrication system.
Figure 5:
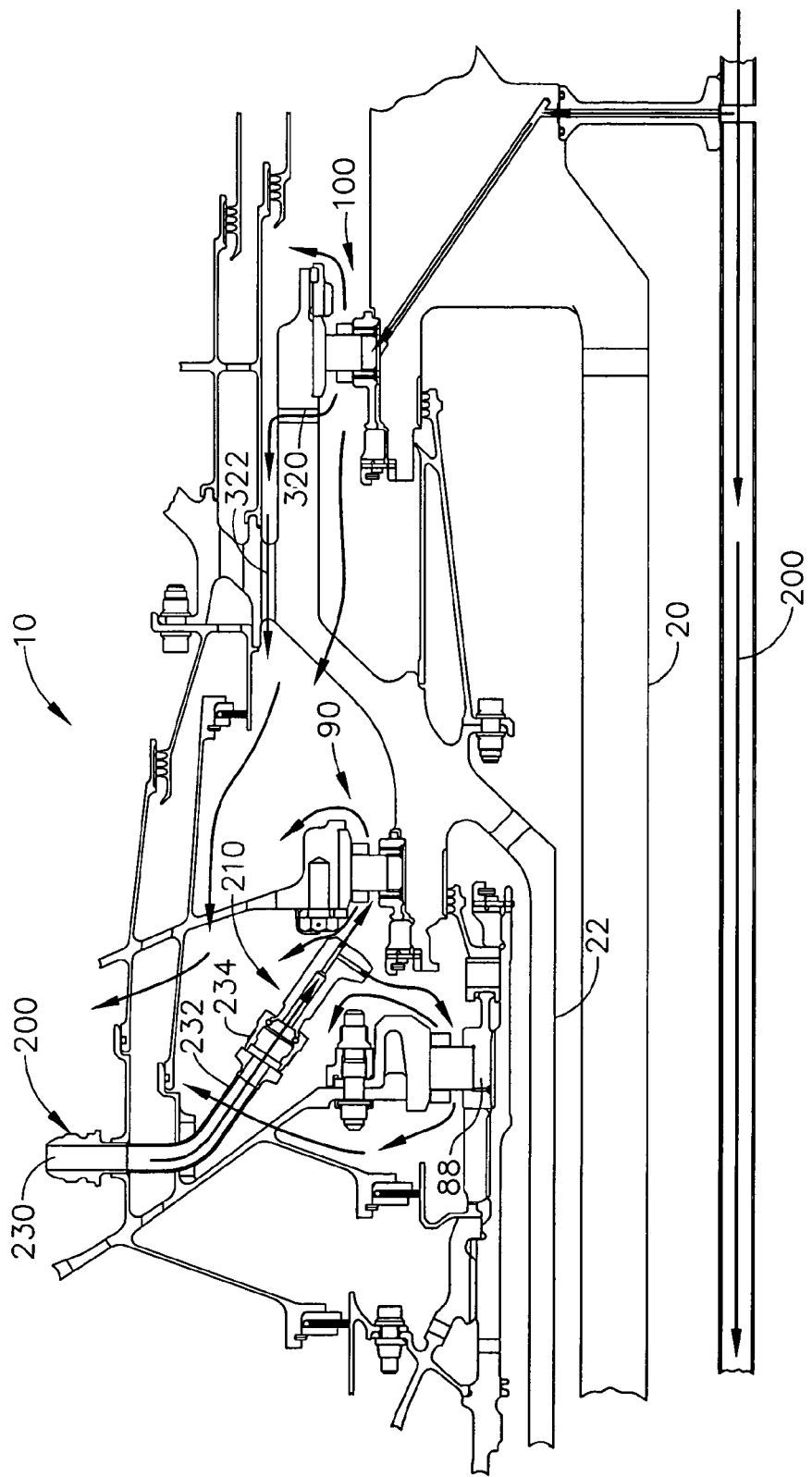
FIG. 5 is a cross-sectional view of a middle portion of gas the turbine engine shown in FIG. 1 that includes an engine lubrication system.
Figure 6:
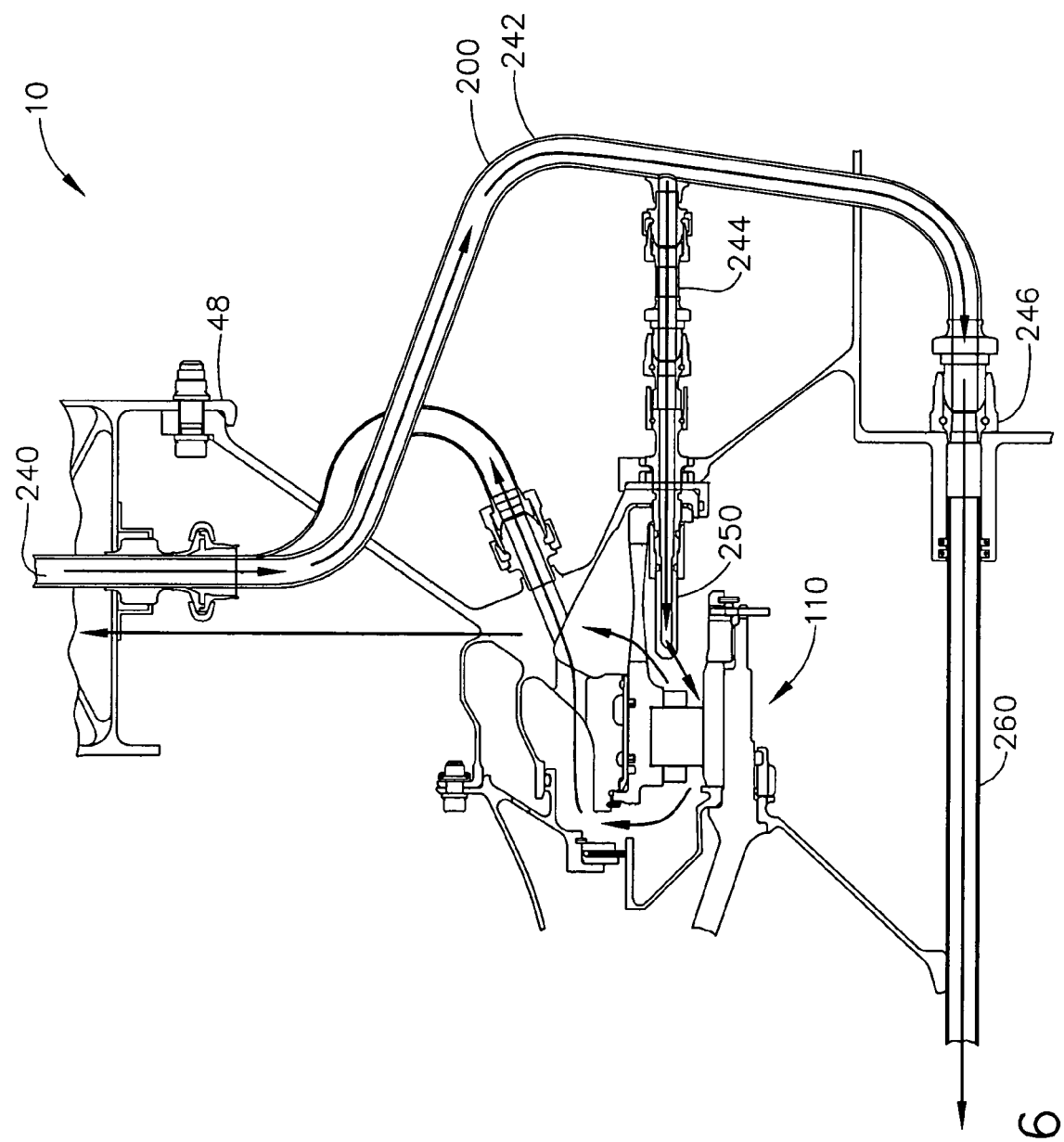
FIG. 6 is a cross-sectional view of an aft portion of gas the turbine engine shown in FIG. 1 that includes an engine lubrication system.

FIG. 4 is a cross-sectional view of a forward portion of gas turbine engine 10 that includes an engine lubrication system 200. FIG. 5 is a cross-sectional view of a middle portion of gas turbine engine 10 that includes engine lubrication system 200. FIG. 6 is a cross-sectional view of an aft portion of gas turbine engine 10 that includes an engine lubrication system 200. In the exemplary embodiment, lubrication system 200 includes a first supply manifold 202 that is coupled to a lube oil supply/scavenge pump (not shown). Supply manifold 202 is coupled to a plurality of jets 210 that supply lubrication oil to bearing assemblies 60 and 70, respectively. More specifically, supply manifold 202 includes a first portion 212 coupled between a fan frame 214 and the lube oil supply/scavenge pump, a second portion 216 that is coupled between the first portion 212 and bearing assembly 70, and a third portion 218 that is coupled to supply manifold 202. In the exemplary embodiment, lubrication oil is channeled from manifold 202 through second portion 216, and discharged through a jet 220 to facilitate lubricating bearing assembly 70. Approximately simultaneously, lubrication oil is channeled from manifold 202, through third portion 218, and discharged through a jet 222 to facilitate lubricating bearing assembly 60.

In the exemplary embodiment, gas turbine engine 10 also includes a supply manifold 230 to facilitate lubricating bearing assemblies 88 and 90 respectively, and a supply manifold 240 to facilitate lubricating bearing assemblies 50, 80, and 110. Supply manifold 230 includes a first portion 232 that is coupled to a jet 234 that is configured to spray lubricating oil through jet 234 and onto bearing assemblies 88 and 90 respectively. Supply manifold 240 includes a first portion 242 that is coupled to manifold 240, a second portion 244 that is coupled to first portion 242, and a third portion 246 that is coupled to first portion 242. In the exemplary embodiment, second portion 244 includes a jet 250 that is configured to spray lubricating oil on bearing assembly 110. In the exemplary embodiment, third portion 246 is coupled to a manifold 260 that is coupled within shaft 20 to facilitate channeling lubrication oil from manifold 240 axially forward to facilitate lubricating bearing assemblies 50 and 80, respectively.

During operation, lubrication oil is channeled from the lube oil supply/scavenge pump through manifolds 202, 230, and 240, respectively. More specifically lube oil channeled through supply manifold 202 is channeled through jets 220 and 222 to facilitate lubricating bearing assemblies 70 and 50 respectively. In the exemplary embodiment, a portion of the lubrication oil channeled through jet 220 is channeled through an opening defined through bearing race 72 and a second portion of the lubrication oil channeled through jet 220 is sprayed directly on bearing rolling element 74. Lube oil channeled through supply manifold 230 is discharged through jet 234 to facilitate lubricating bearing assemblies 88 and 90 respectively. More specifically, lube oil channeled through supply manifold 230 is discharge through jet 234 such that lube oil is sprayed directly on bearing assemblies 88 and 90, respectively.

In the exemplary embodiment, supply manifold 240 channels lubrication oil through third portion 246 to manifold 260 that is coupled within shaft 20 to facilitate channeling lubrication oil from manifold 240 axially forward to lubricate bearing assemblies 50 and 80, respectively. More specifically, during operation, as gas turbine engine 10 rotates, lubrication oil that is channeled through manifold 260 is discharged into a cavity 262 that is defined as an inner surface of an extension cone 264 coupled to shaft 20. As engine 10 rotates, the lubrication oil is forced radially outward due to centrifugal force. The oil collects or pools around an interior surface 266 of cone 264 wherein the lubrication oil is channeled through an opening 270 within bearing race 52 to facilitate lubricating bearing assembly 50. More specifically, because cone 264 is tapered, the lubricating oil is channeled axially forward towards bearing assembly 50 wherein the oil is then channeled through opening 270 to facilitate lubricating bearing assembly 50. A second quantity of oil is also channeled through an opening 280 defined through shaft 20, and through an opening 282 within bearing race 82 to facilitate lubricating bearing assembly 80.

After bearing assembly 50 is lubricated, spent oil is channeled through an opening 300 defined within shaft 22 and into cavity 152. Spent oil is also channeled from bearing assembly 80 into cavity 152 through a plurality of openings 170 and 172. Because gas turbine engine 10 is rotating, centrifugal force causes lubrication oil to be forced radially outward through openings 170 and 172 toward an inner surface 310 of a structural member 312 wherein the lubrication oil is channeled aftward along member 312 through an opening 314 defined within fan frame 214 and back to the lube oil supply/scavenge pump. Moreover, after bearing assembly 60 is lubricated, spent oil is channeled through at least one opening into cavity 152 and after bearing assembly 70 is lubricated, the spent oil is channeled through an opening 184 toward an inner surface 310 of a structural member 312 wherein the lubrication oil is channeled aftward along member 312 through an opening 314 defined within fan frame 214 and back to the lube oil supply and scavenge pump. Moreover, after bearing assemblies 88, 90, and 110 are lubricated, the spent oil is also channeled back to the lube oil supply and scavenge pump. After bearing assembly 100 is lubricated, the spent oil is channeled through a first opening 320, through a second opening 322, and back to the lube oil supply and scavenge pump.

The gas turbine engines described herein include a counter-rotating low-pressure turbine, a first fan assembly and a second fan assembly that rotates in a rotational direction that is opposite the first fan assembly, and a counter-rotating low-pressure turbine. The gas turbine engine also includes a lubrication system and a sump pressurization system. The lubrication system is configured to channel oil through a portion of the rotating fan assembly to facilitates supplying lubrication oil to various bearing assemblies used to support the first and second fan assemblies, and through a fan shaft to facilitate lubricating various bearings used to support the first and second fan assemblies. The gas turbine engine also includes a lubrication system configured to channel lubrication oil through the turbine rear-frame to facilitate lubricating various low-pressure turbine bearings. A sump pressurization system is configured to pressurize various bearing sumps by channeling compressed air from the compressor through at least one stage of the counter-rotating fan assembly. Accordingly, the lubrication and pressurization systems described herein facilitate providing channeling lubrication oil and compressed air across a vane-less counter-rotating fan assembly thereby reducing a quantity of tubing required to both lubricate and pressurize the fan bearing assemblies.

Exemplary embodiments of gas turbine systems are described above in detail. The gas turbine systems are not limited to the specific embodiments described herein, but rather, components of the systems may be utilized independently and separately from other components described herein. Each system component can also be used in combination with other system components.

While the invention has been described in terms of various specific embodiments, those skilled in the art will recognize that the invention can be practiced with modification within the spirit and scope of the claims.

What is claimed is:

1. A method for assembling a gas turbine engine, said method comprising:

providing a first fan assembly configured to rotate in a first rotational direction;

rotatably coupling a second fan assembly to the first fan assembly, wherein the second fan assembly is configured to rotate in a second rotational direction that is opposite the first rotational direction;

coupling a first shaft to the first fan assembly and to a first turbine rotor that is configured to rotate in a first rotational direction;

coupling a first turbine bearing assembly to the first turbine rotor;

coupling a second shaft to the second fan assembly and to a second turbine rotor that is configured to rotate in a second rotational direction that is opposite the first rotational direction;

coupling a second turbine bearing assembly between the first turbine rotor and the second turbine rotor;

coupling a third turbine bearing assembly between the second turbine rotor and a turbine rear-frame; and coupling a lubrication system to the gas turbine engine such that a lubrication fluid is channeled through at least one shaft to lubricate at least one of the first fan assembly, second fan assembly, first turbine bearing assembly, second turbine bearing assembly, and third turbine bearing assembly.

2. A method in accordance with claim 1 further comprising:

coupling a first bearing assembly to the first fan assembly; and coupling a second bearing assembly to the second fan assembly such that the lubrication system channels the lubrication fluid through the first shaft to at least one of the first and second bearing assemblies.

3. A method in accordance with claim 1 wherein coupling a lubrication system to the gas turbine engine further comprises:

coupling a first supply manifold to the gas turbine engine such that a lubrication fluid is channeled to at least one of the first and second fan assemblies; and coupling a second supply manifold to the gas turbine engine such that lubrication fluid is channeled to at least one of the first and second turbine bearing assemblies.

4. A method in accordance with claim 3 further comprising coupling a third supply manifold between the turbine rear-frame and the first fan assembly such that the lubrication system channels the lubrication fluid through the first shaft to at least one of the first and second turbine bearing assemblies.

5. A method in accordance with claim 3 further comprising coupling the third supply manifold to the first shaft such that the third supply manifold is rotatable within the first shaft.

6. A method in accordance with claim 5 wherein the first shaft includes at least one opening extending therethrough, said method further comprising channeling lubrication oil from the third supply manifold through the at least one opening to lubricate at least one of the first and second fan assemblies.

7. A method in accordance with claim 1 further comprising:

coupling a cone to the first shaft such that a cavity is defined between the second shaft and the cone; and channeling lubrication oil through the cavity to lubricate at least one of the first and second fan assemblies.

8. A method in accordance with claim 2 further comprising channeling air from at least a portion of the second fan assembly to facilitate pressurizing the first and second bearing assemblies.

9. A method in accordance with claim 2 further comprising channeling air from at least a portion of the second fan assembly to facilitate venting the first and second bearing assemblies.

10. A gas turbine engine comprising:

a first fan assembly configured to rotate in a first rotational direction;

a second fan assembly rotatably coupled to said first fan assembly and configured to rotate in a second rotational direction that is opposite the first rotational direction;

a first shaft coupled to said first fan assembly and to a first turbine rotor that is configured to rotate in a first rotational direction;

a first turbine bearing assembly coupled to said first turbine rotor;

a second shaft coupled to said second fan assembly and to a second turbine rotor that is configured to rotate in a second rotational direction that is opposite the first rotational direction;

a second turbine beam assembly coupled between said first turbine rotor and said second turbine rotor;

a third turbine bearing assembly coupled between said second turbine rotor and a turbine rear-frame; and a lubrication system coupled to said gas turbine engine such that a lubrication fluid is channeled through at least one shaft to lubricate at least one of said first fan assembly, second fan assembly, first turbine bearing assembly, second turbine bearing assembly, and third turbine bearing assembly.

11. A gas turbine engine in accordance with claim 10 further comprising:

a first bearing assembly coupled to said first fan assembly; and a second bearing assembly coupled to said second fan assembly such that said lubrication system channels the lubrication fluid through said first shaft to at least one of said first and second bearing assemblies.

12. A gas turbine engine in accordance with claim 10 wherein said lubrication further comprises:

a first supply manifold coupled to said gas turbine engine such that a lubrication fluid is channeled to at least one of said first and second fan assemblies; and a second supply manifold coupled to said gas turbine engine such that lubrication fluid is channeled to at least one of said first and second turbine bearing assemblies.

13. A gas turbine engine in accordance with claim 12 further comprising a third supply manifold coupled between said turbine rear-frame and said first fan assembly such that said lubrication system channels the lubrication fluid though said first shaft to at least one of said first and second turbine bearing assemblies.

14. A gas turbine engine in accordance with claim 12 further comprising a third supply manifold coupled to said first shaft such that said third supply manifold is rotatable within said first shaft.

15. A gas turbine engine in accordance with claim 14 wherein said first shaft comprises at least one opening extending therethrough such that lubrication oil is channeled from said third supply manifold through said at least one opening to lubricate at least one of said first and second fan assemblies.

16. A gas turbine engine in accordance with claim 10 further comprising a cone coupled to said first shaft such that a cavity is defined between said second shaft and said cone, wherein the lubrication oil is channeled through said cavity to lubricate at least one of said first and second fan assemblies.

17. A gas turbine engine in accordance with claim 10 further comprising a sump vent system configured to channel air through a turbine mid-frame to facilitate venting said first, second, and third turbine bearing assemblies.

18. A gas turbine engine in accordance with claim 16 wherein said cone comprises a first opening extending therethrough, and said first shaft comprises at least one opening extending therethrough such that air is channeled through said cone first opening, through said first shaft at least one opening, and into said first shaft.

* * * * *

UNITED STATES PATENT AND TRADEMARK OFFICE
CERTIFICATE OF CORRECTION

PATENT NO. : 7,296,398 B2  Page 1 of 1
APPLICATION NO. : 10/976526
DATED : November 20, 2007
INVENTOR(S) : Moniz et al.

It is certified that error appears in the above-identified patent and that said Letters Patent is hereby corrected as shown below:

In Claim 10, column 8, line 20, delete "beam" and insert therefor --bearing--.
In Claim 13, column 8, line 50, delete "though" and insert therefor --through--.

Signed and Sealed this

Twenty-second Day of December, 2009

David J. Kappos
*Director of the United States Patent and Trademark Office*